United States Patent [19]

Holland et al.

[11] 4,174,801

[45] Nov. 20, 1979

[54] HOLLOW CORE PANEL INSERT INSTALLATION DEVICE

[75] Inventors: Charles L. Holland, Escondido; Steven S. Hardy, San Diego, both of Calif.

[73] Assignee: General Dynamics Corporation, San Diego, Calif.

[21] Appl. No.: 932,255

[22] Filed: Aug. 9, 1978

[51] Int. Cl.² ............................................. B21D 47/04
[52] U.S. Cl. ...................................... 227/4; 100/257; 29/718; 227/142
[58] Field of Search ............... 227/4, 40, 142; 29/525, 29/526, 718; 72/441; 100/256, 257

[56] References Cited

U.S. PATENT DOCUMENTS

| 2,928,335 | 3/1960 | Lamb | 100/256 |
| 3,229,619 | 1/1966 | Van Dranen | 100/256 X |
| 3,841,140 | 10/1974 | Hrye | 100/256 X |
| 4,103,611 | 8/1978 | Carlsson | 100/257 |

Primary Examiner—Paul A. Bell
Attorney, Agent, or Firm—John R. Duncan

[57] ABSTRACT

A device for limiting the travel of an arbor press when pressing inserts into a panel. Two insert halves are pressed into a panel from opposite sides by means of an upper and lower anvil. The press movement is stopped by the device when a specified gap between the insert head and the exterior surface of the panel is obtained, compensating for any variations in the panel thickness.

4 Claims, 4 Drawing Figures

HOLLOW CORE PANEL INSERT INSTALLATION DEVICE

BACKGROUND OF THE INVENTION

It is often required to attach components to hollow core panels. Such panels may comprise a light-weight core of metal or plastic honeycomb, foam plastic, or balsa wood, for example, which is sandwiched between two outer skins of any desired material, such as wood, metal or plastic. These hollow core panels have very high strength for their weight and have many applications where weight considerations are important.

Fastening a component to a hollow core panel requires utilizing special inserts that are inserted into the panel from opposite sides and are configured to distribute shear loads into the outer skins of the panel. This is accomplished by large area heads or flanges on the insert which are glued to the outer skin and are of sufficient area to distribute shear loads to the outer skin. In the case of threaded inserts, the portion of the insert passing through the panel core is of sufficient size to carry the compression load of the tightened mounting screw to thereby prevent local compressive crushing of the hollow core panel.

In order to obtain the maximum load transfer from the insert flange to the panel skin it is necessary to position the flange away from the skin at a distance equal to the optimum adhesive thickness. If the thickness of the adhesive is greater or less than the optimum the strength of the bond between the insert and skin will be significantly degraded.

SUMMARY OF THE INVENTION

It is an object of the present invention to provide a device for the efficient pressing of inserts into hollow core panels.

It is also an object of the invention to press an insert into a panel in such a manner that a precise gap is provided between the panel exterior surface and the insert head or flange. This gap is to provide the optimum glue thickness and thereby assure the maximum load transfer between the insert flange and the panel skin.

These objects, as well as others, are accomplished according to the present invention by utilizing a new and novel device wherein an upper anvil and lower anvil positioned on opposite sides of the panel are caused to press half-inserts positioned on opposite sides of the panel into a pre-drilled hole until the half-inserts are connected together to form an insert having a head or flange on each end, each of the two flanges positioned an optimum distance from their respective outside panel skins.

BRIEF DESCRIPTION OF THE DRAWINGS

Referring now to FIG. 1, wherein a hollow core panel 100 has been fitted with an upper insert 101 and a lower insert 102, each insert flange spaced a distance 103 from the outer edge of panel 100. The upper insert 101 was pressed into the panel by upper anvil 10 and the lower insert 102 was pressed into the panel by lower anvil 12, each insert and/or outer skin surface area having been coated with adhesive prior to insertion such that the gaps 103 are filled with the adhesive.

Figure 1:
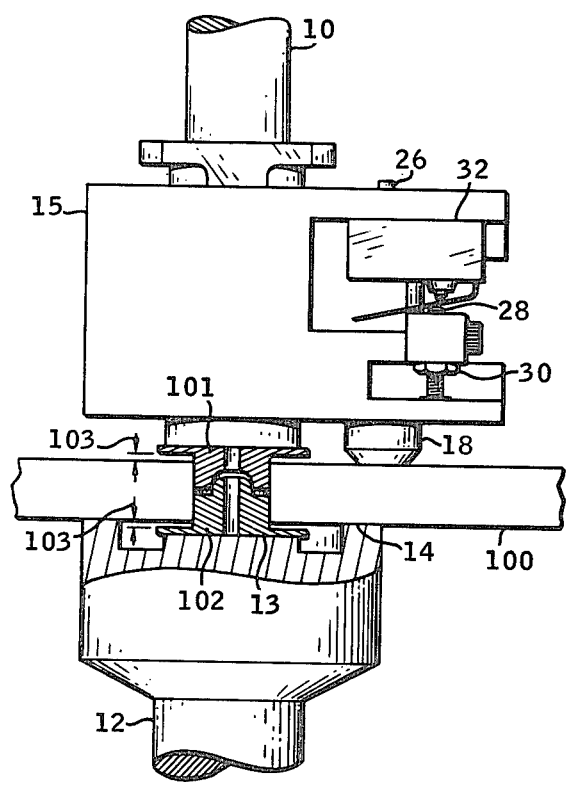
FIG. 1 is a side view of the device as used to press inserts into a panel.

Lower anvil 12 is shaped to provide a mating surface 13 for the lower insert and an outer surface 14 which bears against panel 100 when the lower insert 103 is fully pressed into position. Thus, it may be seen that by varying the difference in height of surfaces 13 and 14 in lower anvil 12 any desired gap 103 may be provided. This is a straight forward method for obtaining the gap 103 for lower insert 102, and a casual observer might assume that the same configured anvil may be utilized for the upper anvil with equally satisfactory results. If the panel 100 was precisely the same thickness throughout and all other panels 100 were the same precise thickness, then the press which drives the upper anvil and lower anvil together could be programmed to a specific stroke that would position surfaces 14 on both anvils to a distance apart equal to the fixed thickness of panel 100. However, if the panel thickness was less, then one or both of the gaps 103 would be excessive, and if the panel thickness was greater then the gaps 103 would be too small. Additionally, with a thicker panel the surfaces 14 of the mating anvils would locally crush the panel. Thus it may be seen that the stroke of the press must be variable in order to accommodate different thicknesses of panel 100.

Figure 4:
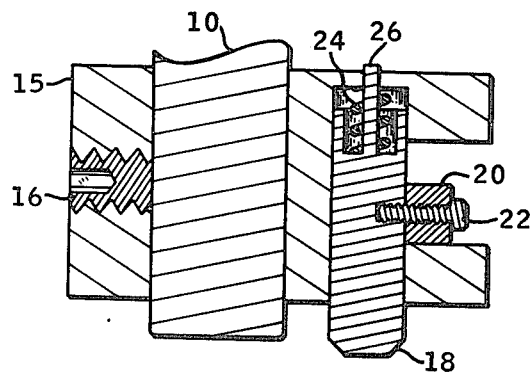
FIG. 4 is a section view of the compensator taken substantially along a plane indicated by line 4—4 in FIG. 2.

In FIG. 4 it will be observed that the thickness compensator body 15 is attached to the upper anvil 10 by a setscrew 16. Fitted within a bore in body 15 is a round pin 18 which is free to reciprocate within body 15, being limited in extension by switch bar 20 which is fastened to pin 18 by means of cap screw 22. A compression spring 24 is fitted within an end bore in pin 18 and around a spring guide pin 26 to bias the pin 18 to the extended position.

Figure 2:
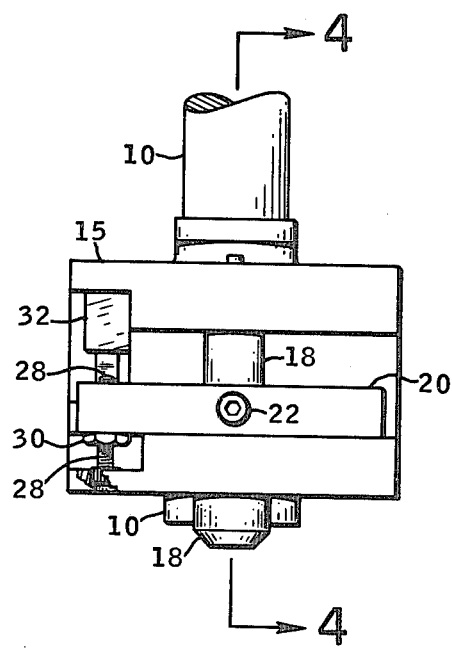
FIG. 2 is an end view of the compensator.

In FIGS. 1 and 2 a side view and end view of the compensator may be seen. Located in one end of switch bar 20 is an adjustment screw 28 which is in threaded engagement with the switch bar 20. A check nut 30 is threaded on adjustment screw 28 to lock the adjustment screw at the desired location. Mounted on the compensator body 15 is a limit switch 32 which is positioned so that it is contacted by screw 28 when pin 18 is sufficiently depressed. When the switch 32 is contacted by screw 28 the switch opens the electrical circuit to the press, thereby stopping the downward motion of upper anvil 10.

Figure 3:
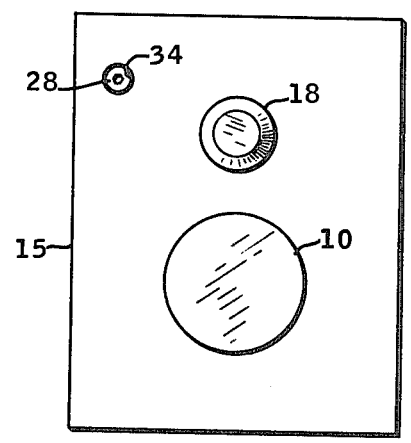
FIG. 3 is a bottom view of the compensator.

In FIG. 3 is shown an access hole 34 in the bottom of body 15 which provides screwdriver access to adjustment screw 28. Once properly adjusted, the screw 28 is held while check nut 30 is tightened to lock the screw 28 in position.

Thus it may be seen that downward motion of upper anvil 10 will bring pin 18 into contact with panel 100, whereupon further motion causes depression of pin 18 until screw 28, by means of switch bar 20, contacts limit switch 32 opening the circuit and stopping the downward motion of anvil 10. It should also be understood that by adjusting the compensator body 15 up or down on upper anvil 10, locking by means of setscrew 16, and adjustment of screw 28 the upper anvil 10 may be caused to stop its downward motion at any desired gap dimension 103 and for various insert flange thicknesses. Where only one flange thickness and one adhesive glue gap are to be provided for, the adjustment features provided by set-screw 16 and adjustment screw 28 may be omitted.

It should be clear from the foregoing that the figures and description herein have been drawn to a single embodiment, and the invention is not to be limited to the specific details, arrangement, and shape of parts herein set forth, since various modifications and arrangements may be made without departing from the spirit and scope of the invention.

Having now described our invention so that others skilled in the art may clearly understand it, we claim:

1. A press anvil position control comprising:
   a lower anvil adapted to be located on a first side of a panel workpiece;
   an upper anvil adapted to be positioned adjacent to the second side of said workpiece opposite said lower anvil;
   said anvils adapted to relative movement toward and away from each other;
   a compensator body mounted on said upper anvil for movement therewith;
   a pin slidably mounted on said body for reciprocating movement substantially parallel to the path of anvil relative movement, said pin adapted to contact a workpiece between said anvils as said anvils undergo relative movement toward each other;
   a switch bar mounted on said pin with its major axis substantially normal to said pin; and
   a limit switch mounted on said body and disposed for operation by said switch bar after said pin contacts said workpiece during relative movement of said anvils toward each other; whereby said switch may control said anvil movement to stop said movement with said anvils at a selected position relative to said workpiece.

2. The device of claim 1 further comprising an adjustment screw in threaded engagement with said switch bar and located to contact said limit switch during a portion of said travel.

3. The device of claim 2 wherein said compensator body is slideably mounted on said upper anvil, and further comprising a set screw in threaded engagement with said compensator body for tightening said body to said upper anvil.

4. The device of claim 3 further comprising a compression spring disposed between said pin and said body for biasing said pin in an extended position.

* * * * *